United States Patent [19]

Wheeler

[11] Patent Number: 5,750,046
[45] Date of Patent: May 12, 1998

[54] REFRIGERANT SYSTEM LUBRICANT AND METHOD

[76] Inventor: William B. Wheeler, P.O. Box 1188, Concord, N.C. 28026

[21] Appl. No.: 863,837

[22] Filed: May 27, 1997

Related U.S. Application Data

[63] Continuation of Ser. No. 701,076, Aug. 21, 1996, abandoned, which is a continuation of Ser. No. 337,864, Nov. 14, 1994, abandoned.

[51] Int. Cl.$^6$ ........................................................ C09K 5/04
[52] U.S. Cl. .................................. 252/68; 62/77; 62/84; 508/463; 508/431; 508/459; 508/501; 508/503; 508/510; 508/516; 508/517; 508/505; 508/109; 508/371; 508/364; 508/405; 508/413
[58] Field of Search .................................. 252/68; 62/77, 62/84; 508/463, 431, 459, 501, 503, 510, 516, 517, 505, 109, 371, 364, 405, 413

[56] References Cited

U.S. PATENT DOCUMENTS

| | | | |
|---|---|---|---|
| 4,242,095 | 12/1980 | Carver | 8/115.6 |
| 4,725,317 | 2/1988 | Wheeler | 106/308 |
| 4,769,178 | 9/1988 | Kenmochi et al. | 508/493 |
| 4,954,363 | 9/1990 | Staker et al. | 426/636 |

*Primary Examiner*—Alan Diamond

[57] ABSTRACT

A method of maintaining and servicing air conditioning systems and compositions therefor are provided whereby newer, more environmentally friendly R-134a refrigerant gas is substituted for the older R-12 and R-22 types. In addition, a method of flushing and internal lubrication of the system is presented, along with a new flush solvent and a new lubricant composition for use with an R-134a refrigerant gas.

12 Claims, No Drawings

REFRIGERANT SYSTEM LUBRICANT AND METHOD

This is a continuation of application Ser. No. 08/701,076, filed 21 Aug. 1996, now abandoned, which is a continuation of application Ser. No. 08/337,864, filed 14 Nov. 1994, now abandoned.

BACKGROUND OF THE INVENTION

1. Field Of The Invention

The invention herein pertains to servicing and maintaining air conditioning systems, and particularly to the servicing of air conditioning systems for vehicles which includes the exchange of older type Chlorofluorocarbon (CFC) gasses for the new, more environmentally safe Hydrofluorocarbon (HFC) gasses.

2. Description Of The Prior Art And Objectives Of The Invention

Air conditioning systems in both buildings and vehicles have for many years utilized Chlorofluorocarbon (CFC) compounds as the desired refrigerant gas. These compounds are sold under various trade names such as Freon (dupont trademark) and have provided satisfactory service for many years. Recently a great concern has developed for protection of the earth's ozone layer, which in certain circles is considered to be attacked or harmed by the release of certain Chlorofluorocarbon (CFC) gasses, particularly from air conditioning systems of vehicles which develop leaks whether through accidents, wear, improper servicing or the like. Government rules now impose safer refrigerant gasses be utilized such as R-134a in place of the older R-12 and R-22 gasses. Lubricants which are dispersed throughout the air conditioning system by the moving gasses insure proper lubrication and working of the air conditioning system. Heretofore, various mineral oils, paraffin oils, and other oils have been used to enhance the operation and durability of air conditioning systems. It has also been known to "flush" the air conditioning system prior to replacing or recharging the refrigerant gas in coventional air conditioning systems by utilizing alcohols, mineral spirits, halogenated ethylene and other solvents to rid the system of water and other impurities and debris which might affect the efficiency and operation of the air conditioning system. More recently, butyl stearate alone has been tried as a lubricant with refrigerant gas R134-a only to be found unsatifactory in mild and low ambient temperatures, thus not providing the necessary lubricity.

In the past, various problems and difficulties have arisen as a result of standard lubricants and flush solvents as certain of the older oils and compositions have not been found to be biodegradable; will not inhibit corrosion, will not neutralize acids formed within the system, and will not encapsulate moisture contained therein. Also, some previously used lubricants may allow condensation products to react with refrigerant gas breakdown products to form acids, while other newer lubricants are not compatible with residual mineral or paraffin oils encountered.

Therefore, it is an objective of the present invention to provide a lubricant for use with refrigerant gas R-134a (hereinafter R-134a), which is biodegradable and which will neutralize residual acids contained within the system.

It is yet another objective of the present invention to provide a flush for existing R-12 systems and to purge R-12 systems during retrofit process from R-12 to 134a. Provisions include. compatability with the components of the old R-12 systems as well as inhibit corrosion.

It is also an objective of the present invention to provide a flush solution for servicing existing R-12 systems.

SUMMARY OF THE INVENTION

The invention herein provides a method for flushing and exchanging R-12 refrigerant systems, particularly vehicle air conditioning systems, which will extend the life and operation of the system while providing trouble-free service for many years. In use, a typical vehicle air conditioning system which contains R-12 refrigerant gas is reclaimed by placing in cannisters for proper refrigerant gas recycling and reuse as required and thereafter a flush solvent containing seventy-five percent (75%) by weight butyl oleate, twelve and a half percent (12½%) by weight of ethoxylated polyoxypropylene molecular weight 2000), ten percent (10%) by weight of ethyoxylated phosphated alcohol ester (potassium salt) and two and a half percent (2½%.) by weight of a surfactant such as nonylphenol polyethylene glycol ether is pumped or forced through the air conditioning system. In a standard six-passenger vehicle air conditioning unit, approximately thirty two (32) to sixty four (64) ounces of flush solvent are used. The air conditioning system is then, purged by air pressure or vacuum as necessary wherein the flush solvent is removed therefrom. The flush solvent while biodegradable, will not form any acids in the air conditioning system and will inhibit corrosion as well as remove moisture and any debris therefrom. Next, the air conditioning system is charged with refrigerant gas R-134a and a lubricant is added to the system such as, by weight, twenty-two and one half percent (22½%) butyl oleate (butyl ester of oleic acid), twenty-two and one half percent (22½%.) butyl stearate (butyl ester of octadecanoic acid), thirty-five percent (35%) ethoxylated castor oil, fifteen percent (15%) by weight of ethoxylated polyoxypropylene and five percent (5%) by weight of an ethyoxylated phosphated alcohol ester for corrosion inhibition.

DETAILED DESCRIPTION OF THE PREFERRED EMBODIMENTS AND OPERATION OF THE INVENTION

Environmental regulations have recently encouraged refrigerant service personnel to recharge conventional air conditioning and other systems with safer, less harmful refrigerant gasses, such as refrigerant R-134a as manufactured by duPont, ICI and others. In order to recharge air conditioning systems with R-134a, it has been found beneficial to first flush the system to clean it of residual moisture, acids and oils and for prevention of corrosion of the metal parts. The system is thus flushed as described in detail above with the preferred flush solvent comprising by weight, seventy-five percent (75%) butyl oleate, twelve and a half percent (12½%) of an ethoxylated polyoxypropylene, ten percent (10%) of an ethyoxylated phosphated alcohol ester (potassium salt), and two and one half percent (2½%) nonylphenol polyethylene glycol ether blended to a homogeneous mixture. The solvent is preferably introduced into the system and forced therethrough as described above. Once the solvent has been drained or evacuated, the system is now ready for charging with R-134a which is utilized with a preferred lubricant composition comprising by weight, twelve and one half percent (12½%) butyl oleate, twelve and one half percent (12½%) butyl stearate, thirty-five percent (35%) of an ethoxylated castor oil such as POE(40) as sold by Henkle Corportion of Amber, Pa., fifteen percent: (15%) ethylene oxide, and five percent (5%) of an ethyoxylated phosphated alcohol ester (potassium salt) in an amount (total) as may be prescribed by the air conditioner manufacturer.

It has been found that this lubricant mixture will not excessively foam and will stay in solution over extended periods of time to provide anti-corrosive effects and neutralization of any acids formed or found therein. The lubricant is compatible with conventional mineral and paraffin oils, olefins, polyethers, and esterified oils and will encapsulate moisture which is encountered in the system and render it harmless. This lubricant is hygroscopic and is compatible with all components as normally encountered in a conventional R-12 refrigerant system.

L As would be understood by those skilled in the art the lubricant and solvent and methods as herein used can be modified; such as by changing the weights of the components and the examples shown are merely the preferred forms of the invention which have proved superior under normal use conditions.

I claim:

1. A method of changing the refrigerant gas in a refrigerant system comprising the steps of:
   (a) removing the old refrigerant gas from the system;
   (b) introducing a flush solvent to the refrigerant system comprising a butyl oleate composition;
   (c) moving the flush solvent through the refrigerant system;
   (d) adding a lubricant to the refrigerant system; and
   (e) adding a new refrigerant gas to the refrigerant system.

2. The method of claim 1, wherein adding a lubricant comprises adding a butyl oleate composition which includes ethylene oxide.

3. The method of claim 1, wherein adding a new refrigerant gas comprises adding R-134a refrigerant gas.

4. The method of claim 1, wherein adding a lubricant comprises adding a butyl oleate and butyl stearate composition.

5. The method of claim 1, wherein introducing a flush solvent comprises introducing a flush solvent comprising by weight:
   75% butyl oleate;
   12½% ethoxylated polyoxypropylene;
   10% ethyoxylated phosphated alcohol ester; and
   2½% surfactant
blended into a homogeneous mixture.

6. The method of claim 1, wherein introducing a flush solvent comprises introducing a flush solvent comprising by weight:
   75% butyl oleate;
   12½% ethoxylated polyoxypropylene;
   10% ethyoxylated phosphated alcohol ester; and
   2½% nonylphenol polyethylene glycol ether
blended into a homogeneous mixture.

7. The method of claim 1, wherein introducing a flush solvent comprises the step of introducing a flush solvent comprising by weight:
   75% butyl oleate;
   12½% ethoxylated polyoxypropylene having a molecular weight of 2000;
   10% ethyoxylated phosphated alcohol ester; and
   2½% nonylphenol polyethylene glycol ether.

8. A flush solvent for an air conditioner system comprising by weight:
   75% butyl oleate;
   12½% ethoxylated polyoxypropylene;
   10% ethyoxylated phosphated alcohol ester; and
   2½% surfactant
blended into a homogeneous mixture.

9. The flush solvent of claim 8, wherein said surfactant comprises a nonylphenol polyethylene glycol ether.

10. The flush solvent of claim 8, wherein said ethoxylated polyoxypropylene has a molecular weight of 2000.

11. A lubricant composition comprising by weight:
   22½% butyl oleate;
   22½% butyl stearate;
   35% ethoxylated castor oil;
   15% ethoxylated polyoxypropylene; and
   5% surfactant
blended into a homogeneous mixture.

12. The lubricant composition of claim 11 wherein said surfactant comprises an ethoxylated phosphated alcohol ester.

\* \* \* \* \*